US007752339B2

(12) United States Patent
Sim et al.

(10) Patent No.: US 7,752,339 B2
(45) Date of Patent: Jul. 6, 2010

(54) MATRIX ARCHITECTURE FOR KVM EXTENDERS

(75) Inventors: Kheng-chuan Sim, Shijr (TW); Wei-hsien Liu, Shijr (TW); Chih-tao Hsieh, Shijr (TW)

(73) Assignee: Aten International Co., Ltd. (TW)

( * ) Notice: Subject to any disclaimer, the term of this patent is extended or adjusted under 35 U.S.C. 154(b) by 417 days.

(21) Appl. No.: 11/247,558

(22) Filed: Oct. 11, 2005

(65) Prior Publication Data

US 2007/0109263 A1 May 17, 2007

(51) Int. Cl.
*G06F 3/00* (2006.01)
*G06F 13/12* (2006.01)
*G06F 13/38* (2006.01)

(52) U.S. Cl. ................................ 710/4; 710/68; 710/69

(58) Field of Classification Search .................. 710/68, 710/69, 4; 395/311
See application file for complete search history.

(56) References Cited

U.S. PATENT DOCUMENTS

| | | | | |
|---|---|---|---|---|
| 5,489,947 | A * | 2/1996 | Cooper | 348/589 |
| 5,504,540 | A | 4/1996 | Shatas | |
| 5,515,058 | A * | 5/1996 | Chaney et al. | 342/359 |
| 5,721,842 | A | 2/1998 | Beasley | |
| 5,884,096 | A | 3/1999 | Beasley | |
| 5,937,176 | A | 8/1999 | Beasley | |
| 6,112,264 | A | 8/2000 | Beasley | |
| 6,160,544 | A * | 12/2000 | Hayashi et al. | 715/716 |
| 6,185,643 | B1 | 2/2001 | Kirshtein et al. | |
| 6,324,605 | B1 | 11/2001 | Rafferty et al. | |
| 6,345,323 | B1 | 2/2002 | Beasley | |
| 6,539,418 | B2 | 3/2003 | Schneider et al. | |
| 6,681,250 | B1 * | 1/2004 | Thomas et al. | 709/226 |
| 7,013,345 | B1 * | 3/2006 | Brown et al. | 709/236 |
| 7,062,596 | B2 | 6/2006 | Kirshtein | |
| 7,272,180 | B2 * | 9/2007 | Dambrackas | 375/240.01 |
| 2002/0143996 | A1 * | 10/2002 | Odryna et al. | 709/246 |
| 2003/0084133 | A1 * | 5/2003 | Chan et al. | 709/222 |
| 2005/0027890 | A1 * | 2/2005 | Nelson et al. | 709/250 |
| 2005/0044186 | A1 * | 2/2005 | Petrisor | 709/219 |
| 2005/0198245 | A1 * | 9/2005 | Burgess et al. | 709/223 |
| 2005/0267931 | A1 * | 12/2005 | Chen et al. | 709/201 |
| 2005/0270296 | A1 * | 12/2005 | Liu et al. | 345/501 |

OTHER PUBLICATIONS

Definition from Dictionary.com, http://dictionary.reference.com/browse/broadcast.*

* cited by examiner

*Primary Examiner*—Niketa I Patel
*Assistant Examiner*—Farley J Abad
(74) *Attorney, Agent, or Firm*—Chen Yoshimura LLP

(57) ABSTRACT

A matrix architecture for KVM extenders connecting a plurality of console terminals and a plurality of computers. The matrix architecture for KVM extenders includes a plurality of first extenders and a plurality of second extenders. The first extenders transform keyboard, mouse analog signals into keyboard, mouse data packets and transform video data packets into video signals for console terminals. The second extenders transform video signals into video data packets and transform keyboard, mouse data packets into keyboard, mouse analog signals. The broadcasters broadcast keyboard, video, mouse data packets, each having a source address and a target address to couple computers to console terminals by broadcasting video data packets from second extenders to first extenders and to couple console terminals to computers by broadcasting keyboard, mouse data packets from first extenders to second extenders.

35 Claims, 6 Drawing Sheets

MATRIX ARCHITECTURE FOR KVM EXTENDERS

FIELD OF THE INVENTION

The present invention generally relates to a matrix architecture and more particularly to a matrix architecture for KVM extenders interconnecting among a plurality of consoles and a plurality of computers.

BACKGROUND OF THE INVENTION

The keyboard-video-mouse (KVM) switch interconnecting a plurality of console devices and a plurality of computers with conditioning circuits coupled to the corresponding console devices and computers is a so-called matrix KVM switch. It is a solution to the access of computers through the matrix cross switch to remotely control the selected computers at the console device for multi-users. Referring to FIG. 1, a traditional matrix cross switch for interconnecting a plurality of remote console devices and computers is shown. The prior arts related with such traditional cross switch has been disclosed in U.S. Pat. No. 5,721,842, U.S. Pat. No. 5,884,096, U.S. Pat. No. 5,937,176, U.S. Pat. No. 6,345,323 and U.S. Pat. No. 6,112,264. The cross switch 114 manages all the keyboard-video-mouse signals for routing the remote console devices (102, 104 or 106) to one of the selected computers (108, 110 or 112). Furthermore, the cross switch cannot work as far as what it's required practically without the cooperation of the conditioning circuits (120, 122, 124, 126, 128, 130). The principle of the cross switch is described below.

First, the user selects one computer at one remote console device. From the remote console device, the user sends the keyboard, mouse signals through the conditioning circuit coupled to the remote console device, the cross switch 114 and then the conditioning circuit coupled to the selected computer to control the selected computer, and receive the video signals for showing on the monitor of the remote console device in reverse order. For example, if the user selects the computer 108 at the remote console device 102, the other computers 110 or 112 will not receive the keyboard or mouse signal from the remote console device 102. At the remote console side, the user operates the keyboard and mouse to send the keyboard, mouse signals from the extender 120, via the cross switch 114 and the conditioning circuit 126 to control the computer 108. For showing the operating status on the monitor of the remote console device for the user simultaneously, the video signals from the computer consequent on the operating of the keyboard and mouse was sent from the conditioning circuit 126, through the cross switch 114 and the conditioning circuit 120 back to the remote console device to be shown on the monitor for user. The other user can operate at the other remote console devices as the same even at the same time. Consequentially, no matter at any of the remote console devices (102, 104, 106) the user can control any of the computers (108, 110, 112) with the cross switch working with the conditioning circuits for practical requirement. Further, the purpose of the multi-console devices is to allow multi-user operation to different computers at the same time.

However, the cross switch 114 is complicated and costly. On the other hand, once the cross switch 114 crashed, the communication of whole architecture 100 becomes dead due to its center position in mainly managing all the keyboard-video-mouse signals among the remote console devices and computers. Each of the users who are operating at the remote console devices takes a risk equally. Moreover, the reason for using the conditioning circuits is only to extend the distance, between the specific remote console device and the cross switch 114, also between the cross switch 114 and the specific computer. Unfortunately, the existing conditioning circuit still has limitation in extending the distance between the remote console device and the computer. Generally, the extended distance of the current conditioning circuit that allows the user to remotely control the computers or KVM switch is up to 150 meters. Some might reach up to 300 meters. Practically, the manufacturers still keep working on better design to extend the distance that the conditioning circuit allows for users definitely demand. However, it has to take lots of efforts to prevent the transmission decay of the keyboard-video-mouse signals when the desired distance is longer as one cable is used. Consequentially, there's a need of a matrix architecture for conditioning circuit to avoid a crash of the whole architecture 100 as using only one cross switch 114 for transmitting signals. Also, there is a demand for distance extension between the console terminals and computers.

SUMMARY OF THE INVENTION

To solve the foregoing drawbacks in the prior art, it is an object of the present invention to provide a matrix architecture for KVM extenders that the matrix architecture provides at least two routes between any of the first extenders and any of the second extenders. The matrix architecture can avoid the whole network down while only one cross switch is used to transmit signals between computers and console terminals and the cross switch may fail.

Another object of the present invention is to provide a matrix architecture for KVM extenders connecting a plurality of console terminals, each having a keyboard, a mouse and a monitor, to a plurality of computers, including a plurality of broadcasters. The matrix architecture extends the distance between the console terminals and computers due to the broadcasters therebetween.

To accomplish the above objects, the present invention provides a matrix architecture for KVM extenders connecting a plurality of console terminals and a plurality of computers. The matrix architecture for KVM extenders includes a plurality of first extenders and a plurality of second extenders. The first extenders coupled to the console terminals and the broadcasters transform keyboard, mouse analog signals into the keyboard, mouse data packets and transform the video data packets into video signals to be displayed on monitors of the console terminals. The broadcasters broadcast the keyboard, mouse data packets, each having a source address and a target address indicating one of the console terminals and one of the computers, respectively, to couple one of the console terminals to one of the computers. In the meanwhile, the broadcasters broadcast the video data packets, each having a source address and a target address indicating one of the computers and one of the console terminals, respectively to route the packets from the computers to the console terminals.

The second extenders, coupled to the computers and the broadcasters, transform the video signals into the video data packets and transform the keyboard, mouse data packets into the keyboard, mouse analog signals for controlling the computers. The broadcasters broadcast the video data packets, each having a source address and a target address indicating one of the computers and one of the console terminals, respectively, to couple one of the computers to one of the console terminals, or route the video data packets from one of the computers to one of the console terminals by broadcasting the video data packets from the second extenders to the first extenders. In the meanwhile, the broadcasters broadcast the keyboard, mouse data packets, each having a source address and a target address indicating one of the console terminals and one of the computers, respectively to couple one of the console terminals to one of the computers, or route the keyboard, mouse data packets from one of the console terminals to one of the computers by broadcasting the keyboard, mouse data packets from the first extenders to the second extenders, wherein the broadcasters generate at least two routes for broadcasting the keyboard, video, mouse data packets between each of the console terminals and each of the computers.

Each of the first extenders receives every single video data packet having the target address indicating the specific corresponding console terminal but only the first extender coupled to the corresponding console terminal having its unique address responds to the video data packets having the target address indicating the unique address of the console terminal. The first extender transforms the video data packets into video signals as responding.

By the same token, Each of the second extenders receives every single keyboard, mouse data packet having the target address indicating the specific corresponding computer but only the second extender coupled to the corresponding computer having its unique address responds to the keyboard, mouse data packets having the target address indicating the unique address of the computer. The first extender transforms the keyboard, mouse data packets into keyboard, mouse signals as responding. In the preferred embodiment, the hubs are employed to be the aforementioned broadcasters. Equivalent to the hub for the present invention, any packet transceiver, such as a router, a bridge or a switching hub, also can be used to serve as the broadcaster. The packet transceivers broadcast the keyboard, video and mouse data packets in the standard of Ethernet. Due to the characteristic of the Ethernet, the matrix architecture can extend the distance between the console terminals and computers by adding one or more packet transceivers therebetween.

Furthermore, each of the first extenders comprises a first central processing unit (CPU) and a digital-to-analog converter. Each of the first CPU may decompress the video data packets, each having a target address to the corresponding console terminal coupled with the first extender, if needed. The digital-to-analog converter transforms the video data packets into the video analog signals for the monitor of the corresponding console terminal coupled with the first extender. Each of the second extenders comprises a second CPU and an analog-to-digital converter. The second CPU may compress the video data packets transformed from the video analog signals, if needed. The analog-to-digital converter transforms the video analog signals from the corresponding computer into the video data packets.

Specifically, the broadcasters, such as hubs, broadcast the keyboard, video and mouse data packets in the standard of Ethernet. As a result, the present matrix architecture can extend the distance between the console terminals and computers by the added one or more packet transceivers as the relay to prevent the decay of the signal transmission. Although, the well-known 5-4-3 rule must apply with only regards to hubs as described after for limiting the size of the collision domain not to be too large for well network. "There may be a maximum of 5 segments between two hosts in a network, and there may be at most 4 hubs between these hosts and finally there may only be users on 3 of the segments". Such restriction means: the numbers of hub that we can arrange between any of the console terminals and any of the computers cannot exceed 4. However, we can combine the any kind of packet transceiver, such as a router, a bridge or a switching hub to satisfy the rule of 5-4-3 rule to overcome the rule's limitation. Theoretically, there will be no limitation for extending the distance therebetween as a result. Besides the merit above, with an appropriate wiring arrangement for the broadcasters in the matrix architecture, at least two routes are provided for broadcasting the keyboard, video, mouse data packets between each of the console terminals and each of the computers in the matrix architecture to avoid a crash of the whole network, following that the matrix KVM switch gets crashed in case of using only one KVM switch for transmitting keyboard-video-mouse signals.

Obviously, the present matrix architecture functions as not only a KVM extender but also a matrix KVM switch simultaneously. Meanwhile, in the present invention, there is no complicated and costly cross switch needed. That is, the present matrix architecture has a simpler structure compared with prior art matrix KVM switches and further provides a longer extending distance compared with prior art conditioning circuit.

Furthermore, the present invention benefits the user who employs the existing network architecture, probably in his workplace, which has already included hubs, routers, bridges or switching hubs for the network sharing without extra cost. Without the present invention, the user who uses the prior KVM switch has to re-arrange the network architecture for adding the cross switch according to the prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
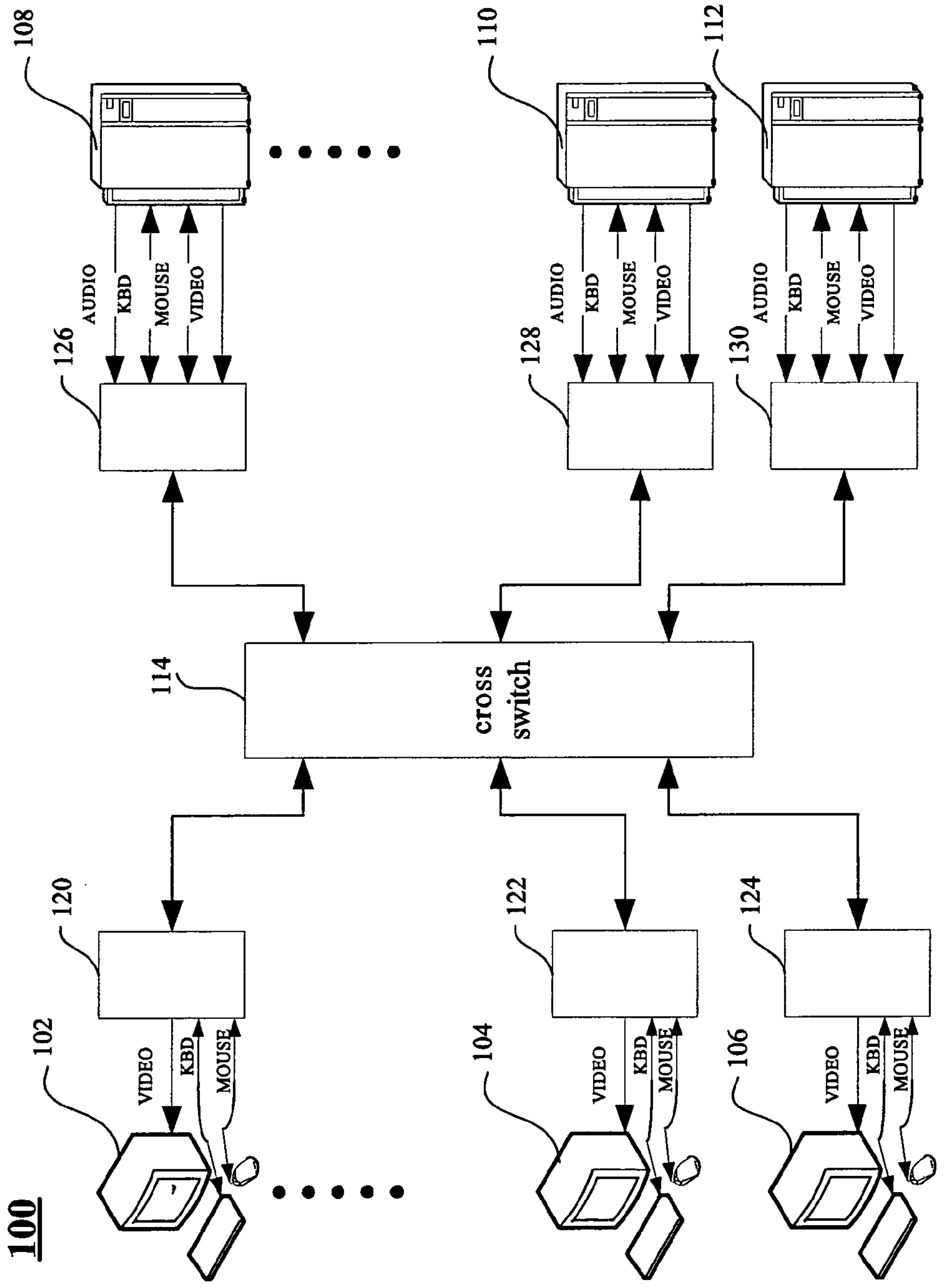
FIG. 1( Prior Art )
FIG. 1 illustrates a traditional matrix KVM switch for interconnection of a plurality of remote consoles and computers.
Figure 2:
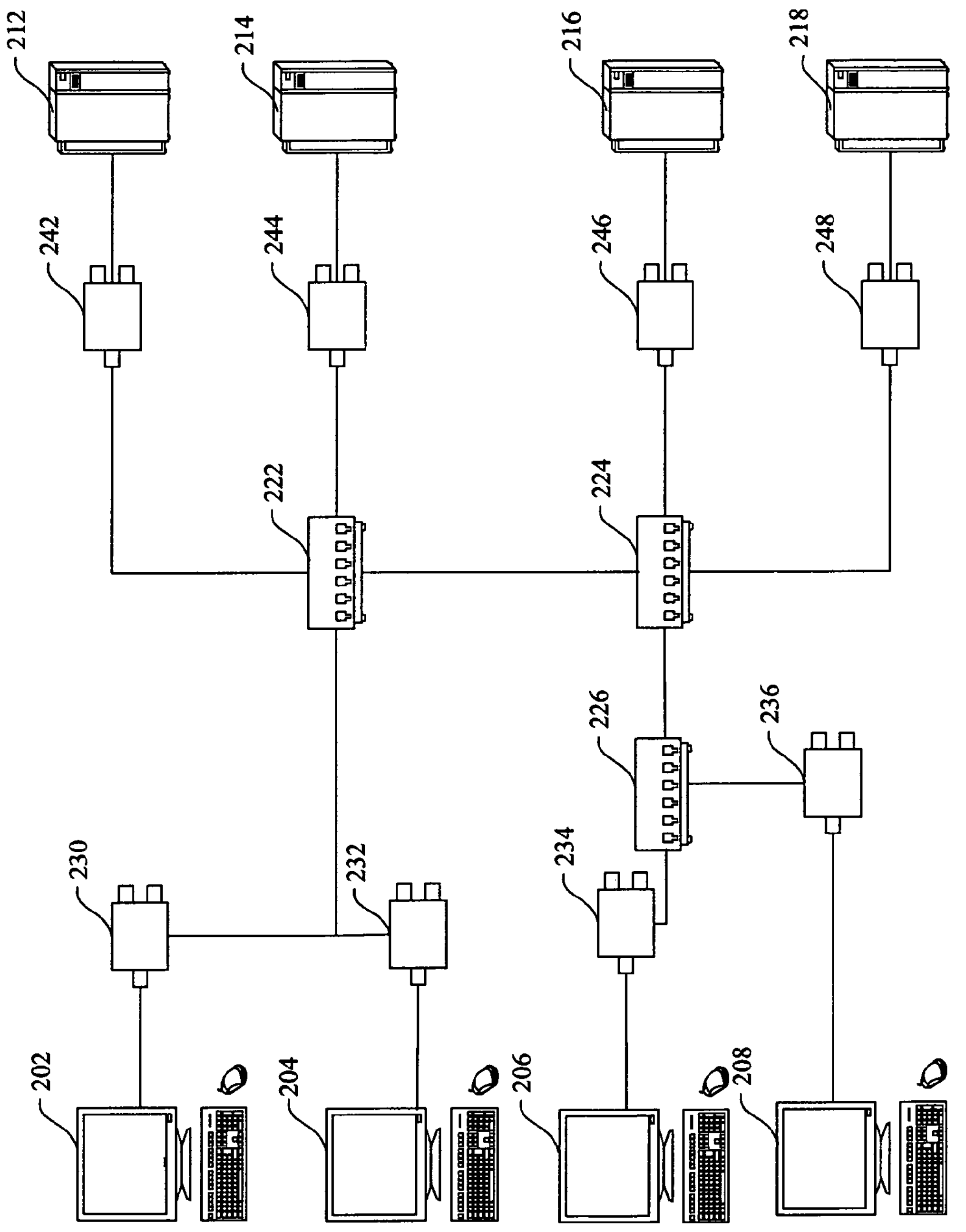
FIG. 2 shows the matrix architecture for KVM extenders to broadcast keyboard-video-mouse data packets via broadcasters among the console terminals and computers according to first embodiment of the present invention.

Please referring to FIG. 2, which shows the matrix architecture for KVM extenders to broadcast keyboard-video-mouse data packets via broadcasters among the console terminals and computers according to first embodiment of the present invention. It extends the distance and the simple components inside the first and second extender and avoids that the "whole network" gets down, following that the matrix KVM switch gets crashed in case of using only one cross switch for transmitting signals, since there is only one route between each of the console terminals and each of the computers. The purpose of at least two routes between each console terminal and each computer is to erase the probability of the whole network's getting crashed caused by the cross switch for transmitting signals centrally. With the appropriate wiring arrangement for the broadcasters in the matrix architecture, the object can be achieved. First, the console terminals (202, 204, 206, 208) and the computers (212, 214, 216, 218) own the unique addresses themselves, therefore, their uniqueness in the Ethernet network can be identified. The addresses used in the network are in the form of IP (Internet Protocol) or MAC (Media Access Control). The remote terminals (202, 204, 206, 208) are coupled with the first extenders (230, 232, 234, 236) respectively. Through the arrangement of wiring hubs, coupling to the second extenders (242, 244, 246, 248), the connecting lines for accessing the computers (212, 214, 216, 218) are accomplished.

To cite an instance, the user at the console terminal 202 would like to control the computer 212. First, the keyboard, mouse signals generated by the console terminal 202 are sent to the first extender 230. The signals are transformed into keyboard, mouse data packets, each having a source address indicating the console terminal 202 and a target address indicating the selected computer 212 by the first extender 230. Then, the first extender 230 sends these keyboard, mouse data packets to the hub 222.

The hub 222 also broadcasts the keyboard, mouse data packets to the second extenders (242, 244) and to the hub 224. Then, the keyboard, mouse data packets are broadcasted by the hub 224, to the second extenders (246, 248). Although, each of the second extenders receive the keyboard, mouse data packets, only the second extender 242 coupled to the computer 212 which is pre-defined to be assigned the target address transforms the keyboard, mouse data packets into the keyboard, mouse signals for controlling the computer 212. The other second extenders (244, 246, 248) will not process the keyboard, mouse data packets. Because the target address comprised in each of the keyboard, mouse data packets do not comply with the addresses of the computer (214, 216, 218), which are coupled to the second extenders (244, 246, 248).

Furthermore, from the computer 212, the video signals are generated and sent to the second extender 242. The signals are transformed into video data packets, each having a source address indicating the computer 212 and a target address indicating the console terminal 202, respectively by the second extender 242. The second extender 242 sends these video data packets to the hub 222. The hub 222 broadcasts the video data packets to the first extender (230, 232) and to the hub 224, then the hub 226. The hub 226 broadcasts the video data packets to the first extenders 234 and 236. Similarly as the keyboard, mouse data packets are treated, each of the first extenders receive the video data packets, but only the first extender 230 coupled to the console terminal 202 which is pre-defined to be assigned the target address transforms the video data packets into the video signals for being displayed on the monitor of the console terminal 202. The other first extenders (232, 234, 236) will not process the video data packets. Because the target address comprised in each of the video data packets do not comply with the addresses of the console terminals (204, 206, 208), which are coupled to the first extenders (232, 234 236). The similar does to the case at the console terminals 204, 206 and 208.

So far as described above, the user can remotely control any of the computers aside to any of the console terminals. With establishing the matrix architecture for the first extenders (230, 232, 234, 236) and second extenders (242, 244, 246, 248), accompanying the hubs (222, 224, 226) between the first extenders (230, 232, 234, 236) and second extenders (242, 244, 246, 248) coupled to the console terminals (202, 204, 206, 208) and the computers (212, 214, 216, 218), the distance between the console terminals (202, 204, 206, 208) and the computers (212, 214, 216, 218) can be extended according to the number of the hubs used avoid a crash of the whole network, following a crash of the cross switch if the only cross switch for transmitting keyboard-video-mouse signals crashed.

Figure 3:
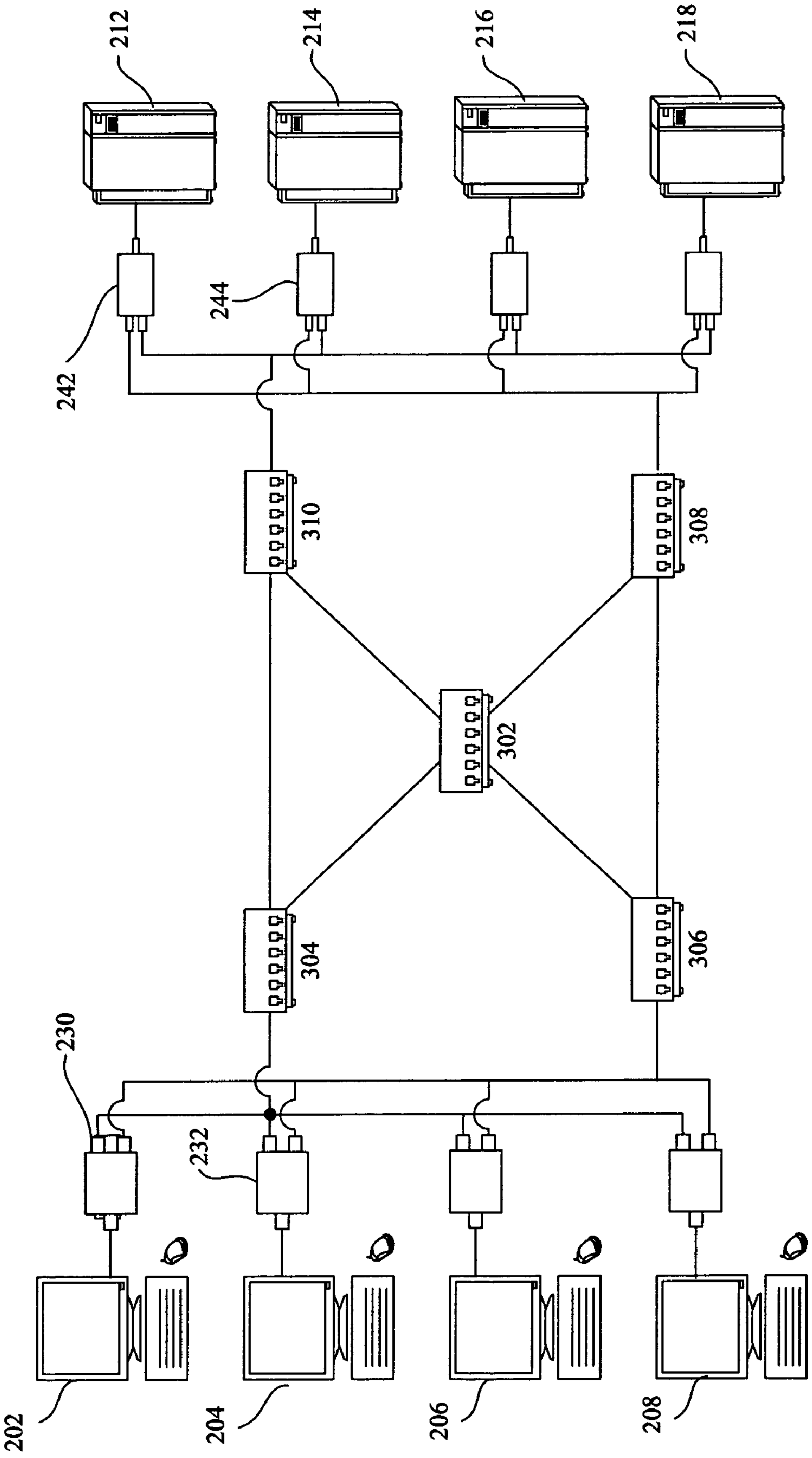
FIG. 3 shows the matrix architecture for KVM extenders to broadcast keyboard-video-mouse data packets via broadcasters among the console terminals and computers according to second embodiment of the present invention.

Please further referring to the FIG. 3, which is the second embodiment of the matrix architecture for KVM extenders to broadcast keyboard-video-mouse data packets via broadcasters among the console terminals and computers according to the present invention. For example, the user is controlling the computer 212 at the console terminal 202 through the first extender 230 coupled to the console terminal 212 and the second extender 242 coupled to the computer 202. Normally, the route is hub 304-hub 310. If hub 304 crashed, the route changes to another route, such as hub 306-hub 302-hub 310. If hub 310 crashed, the route changes to another route, such as hub 304-hub 302-hub 308. If hub 304 and hub 310 crashed, the route changes to another route, such as hub 306-hub 308. Here is the illustration of the console terminal 202 goes with the computer 212. Various combinations of the console terminals and computers can achieve the same result.

Figure 4:
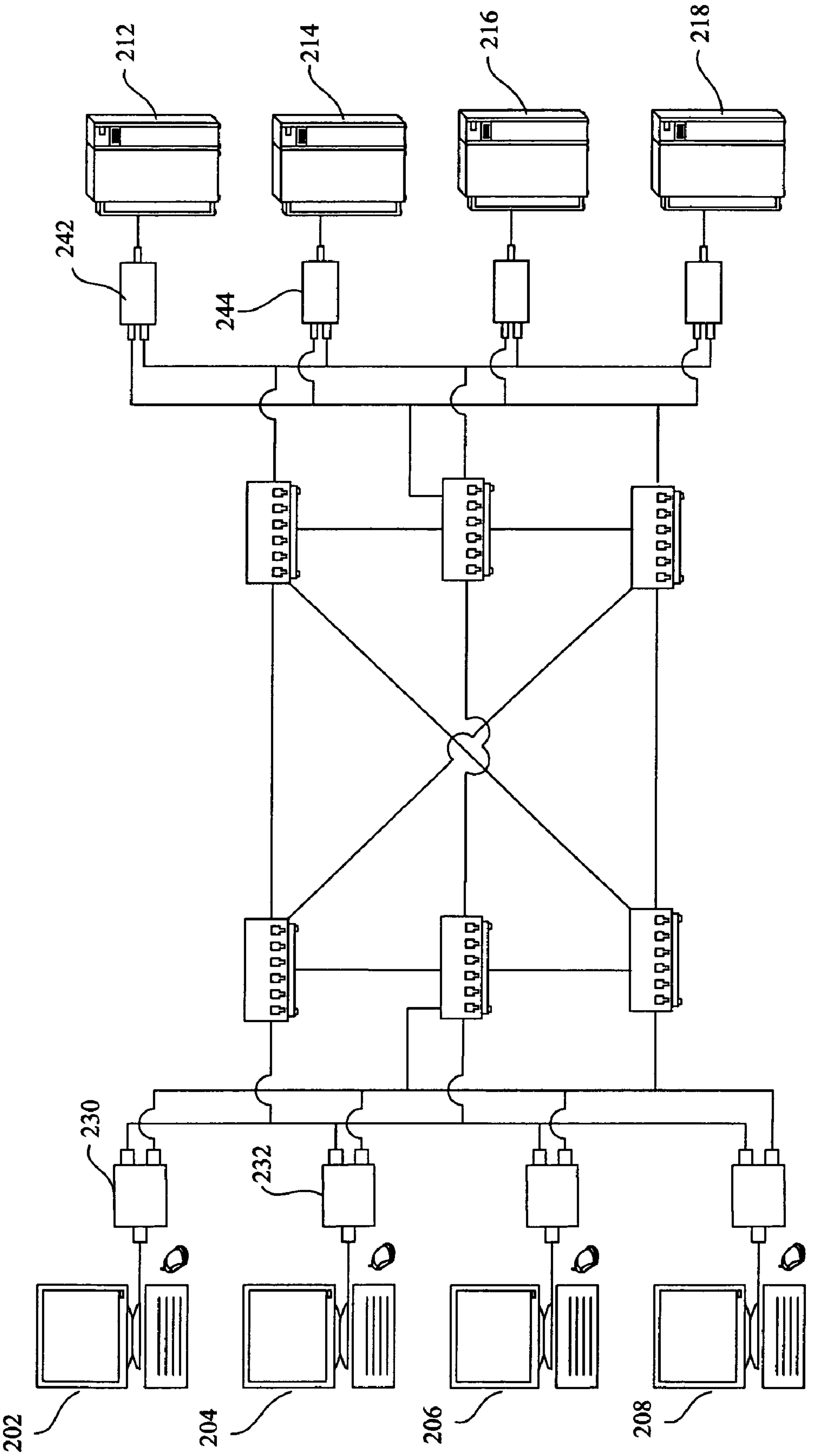
FIG. 4 shows the matrix architecture for KVM extenders to broadcast keyboard-video-mouse data packets via broadcasters among the console terminals and computers according to third embodiment of the present invention.

Please referring to FIG. 4 which shows third embodiment of the matrix architecture for KVM extenders to broadcast keyboard-video-mouse data packets via broadcasters among the console terminals and computers according to the present invention and FIG. 3. Such as the users are controlling either the computer (212, 214) at the console terminals 202 or 204 through the first extenders (230, 232) coupled to console terminals (202, 204), respectively and the second extenders (242, 244) coupled to the computers (212, 214), respectively. There will be at least two routes provided to broadcast the keyboard, mouse data packets from each of the console terminals to each of the computers in the matrix architecture or broadcast the video data packets in reverse order. As a result, the crash of the network caused by the failure of the only one cross switch transmitting signals can be avoided with such appropriate wiring arrangement for the hubs in the matrix architecture. Meanwhile, the present invention is able to extend the distance between any of console terminals and any of computers by adding one or more hubs therebetween as many as the user wants.

Figure 5:
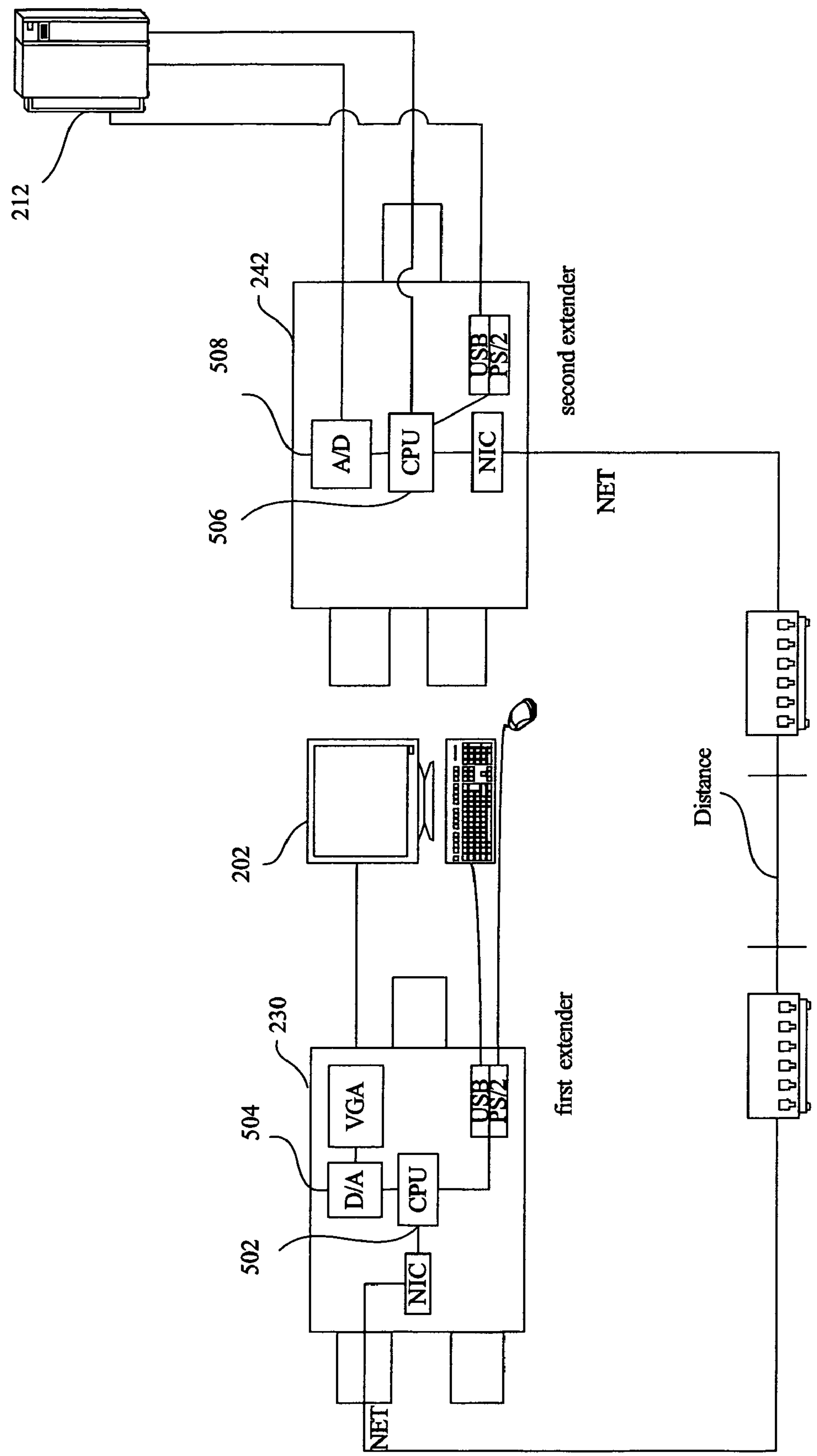
FIG. 5 illustrates the route between one console terminal coupled with one first extender and one computer coupled with one second extender, by connecting hubs therebetween to extend the distance and the simple components inside the first and second extender.

Refer to FIG. 5 illustrating the route between one console terminal 202 coupled with one first extender 230 and one computer 212 coupled with one second extender 242, by connecting hubs therebetween to extend the distance and the simple components inside the first extender 230 and second extender 242. The first extender 230 includes a first CPU 502, a digital-to-analog converter 504 (D/A converter) a connector for keyboard, mouse, a Video Graphics Array (VGA) controller and a network interface controller (NIC). The second extender 242 includes a second CPU 506, an analog-to-digital converter 508 (A/D converter), connector for keyboard, mouse output port of the computer and the Network Interface Controller (NIC). In FIG. 5, two hubs are shown. The distance between the console 202 and computer 212 can be extended as long as the number of hubs or other packets transceivers increased. The extended distance of adding one packets transceiver depends on the ability of specification of the packets transceiver.

Furthermore, the video data packets bring about the large transmission (As the public knows, the video signals are enormous loading for network). The second CPU 506 of the second extender 242 may compress the video data packets, each having a source address indicating the corresponding computer 212 coupled with the second extender 242 and a target addresses indicating the corresponding console terminal 202 coupled with the first extender 230 after the A/D converter 508 transforms the video signals into the video data packets. The first CPU 502 decompresses the video data packets, each having a source address indicating the corresponding computer 212 coupled with the second extender 242 and a target address indicating the corresponding console terminal 202 coupled with the first extender 230 before the D/A converter 504 transforms the video data packets into the video signals for being displayed on the monitor of the console terminal. Compressing video data packets is effective to decrease the transmission loading of the whole network.

Figure 6:
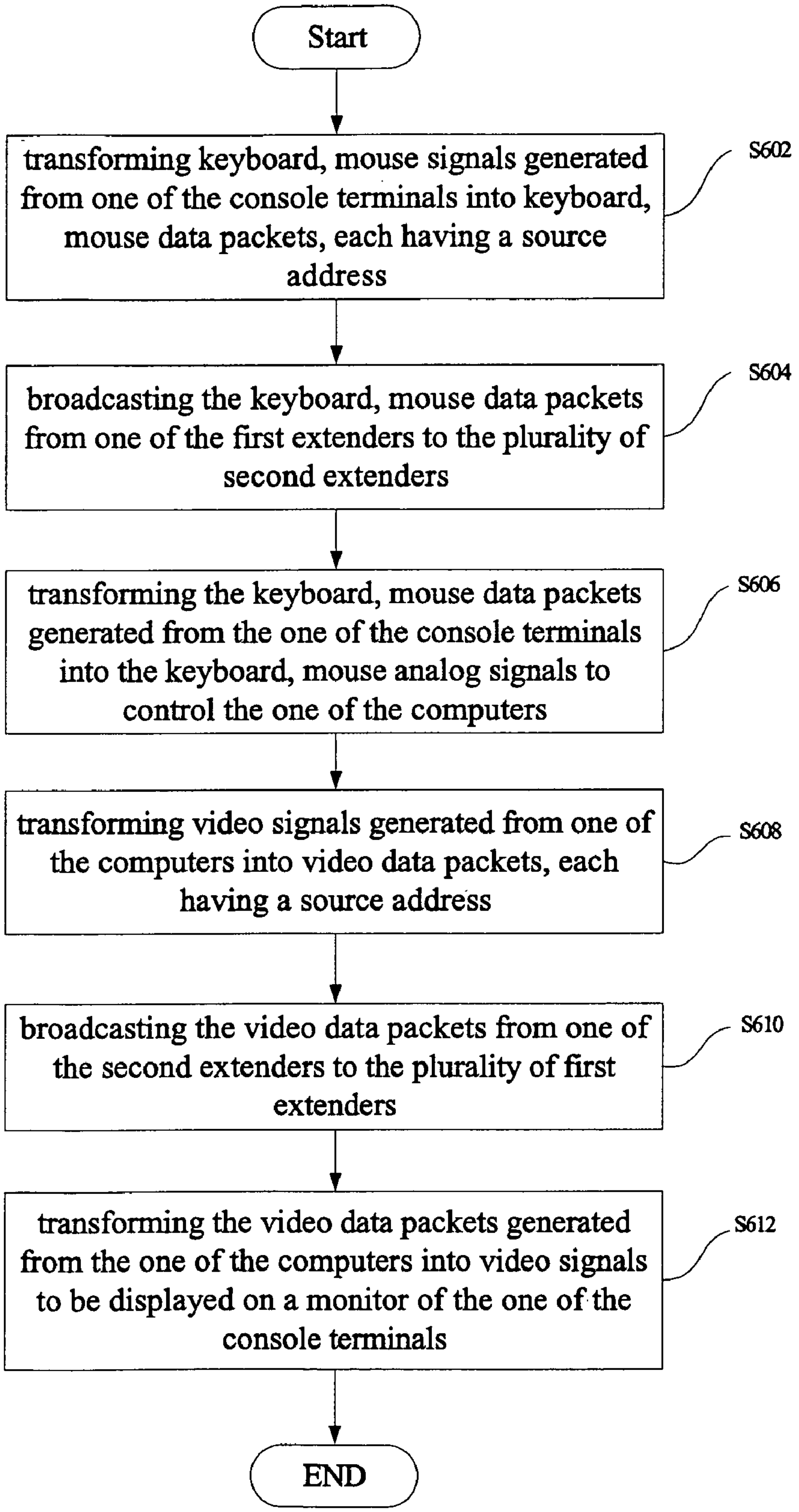
FIG. 6 shows a flow chart of the method used in a matrix architecture for routing one of a plurality of console terminals connected to a plurality of first extenders to one of a plurality of computers connected to a plurality of second extenders.

FIG. 6 is a flow chart of the method used in the present matrix architecture shown in from FIG. 2 to FIG. 4 for routing one of a plurality of console terminals connected to a plurality of first extenders to one of a plurality of computers connected to a plurality of second extenders. The method is described below.

In step S602, transforming keyboard, mouse signals generated from one of the console terminals into keyboard, mouse data packets, each having a source address;

In step S604, broadcasting the keyboard, mouse data packets from one of the first extenders to the second extenders;

In step S606, transforming the keyboard, mouse data packets generated from the one of the console terminals into the keyboard, mouse analog signals to control the one of the computers;

In step S608, transforming video signals generated from one of the computers into video data packets having a source address;

In step S610, broadcasting the video data packets from one of the second extenders to the first extenders; and In step S612, transforming the video data packets generated from the one of the computers.

As aforementioned, the hubs broadcast the keyboard, video, mouse data packets. The first and second extenders respond to the keyboard, video, mouse data packets according to the standard of Ethernet. That is to say, only the data packets, each having target address directed to the console terminal or the computer received by the first extender or second extender will be transformed into keyboard, mouse or video signals. Otherwise, these data packets will not be processed.

In conclusion, the proposed invention is to provide a matrix architecture for KVM extenders that the matrix architecture provides at least two routes between each of the first extenders and each of the second extenders and, meanwhile, considerably extends the distance between the console terminals and computers by adding the broadcasters therebetween.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A matrix architecture for transmitting keyboard, mouse signals generated by a plurality of console terminals and video signals generated by a plurality of computers via a plurality of broadcasters between the console terminals and the computers, the matrix architecture comprising:

a plurality of first extenders, each coupled to one of the console terminals, and coupled to one or more of the broadcasters via a network interface controller of the first extender, transforming keyboard, mouse signals from the coupled console terminal into the keyboard, mouse data packets and transforming video data packets received from the one or more broadcasters into video signals to be displayed on a monitor of the coupled console terminal, wherein each keyboard, mouse data packet has a source address associated with the coupled console terminal and a target address associated with one of the computers, wherein each video data packet has a source address associated with one of the computers and a target address associated with one of the console terminals, wherein the broadcasters broadcast the keyboard, mouse data packets and the video data packets; and a plurality of second extenders, each coupled to one of the computers, and coupled to one or more of the broadcasters via a network interface controller of the second extender, transforming video signals from the coupled computer into the video data packets and transforming keyboard, mouse data packets received from the one or more broadcasters into the keyboard, mouse signals for the coupled computer, wherein each video data packet has a source address associated with the coupled computer and a target address associated with one of the console terminals, wherein each keyboard, mouse data packet has a source address associated with one of the console terminals and a target address associated with the coupled computer, wherein the broadcasters broadcast the video data packets and broadcast the keyboard, mouse data packets wherein the broadcasters broadcast each keyboard, mouse data packet from any one of the first extenders to all of the second extenders, and broadcast each video data packet from any one of the second extenders to all of the first extenders, regardless of the target addresses in the data packets.

2. The matrix architecture of claim 1, wherein the source address and the target address are IP addresses.

3. The matrix architecture of claim 1, wherein the source address and the target address are MAC addresses.

4. The matrix architecture of claim 1, wherein the first extender responds to the video data packets, each having the target address indicating the console terminal coupled with the first extender according to the standard of Ethernet.

5. The matrix architecture of claim 1, wherein the second extender responds to the keyboard, mouse data packets, each having the target address indicating the computer coupled with the second extender according to the standard of Ethernet.

6. The matrix architecture of claim 1, wherein the broadcasters are devices, which are capable of transmitting and receiving packets.

7. The matrix architecture of claim 6, wherein the devices are selected from the group consisting of hub, switch hub, bridge and router.

8. The matrix architecture of claim 7, wherein the devices broadcast the keyboard, video, mouse data packets in an Ethernet standard.

9. The matrix architecture of claim 7, wherein the transmission distances between the console terminals and computers are extended by additionally added one or more hubs.

10. The matrix architecture of claim 1, wherein each of the first extenders comprises:

a first central processing unit (CPU), decompressing the video data packets, each having target address indicating the console terminals; and a digital-to-analog converter, transforming the video data packets into the video analog signals for the monitor of the console terminals.

11. The matrix architecture of claim 1, wherein each of the second extenders comprises:

an analog-to-digital converter, transforming the video analog signals from the computer into the video data packets; and a second CPU, compressing the video data packets transformed from the video analog signals.

12. The matrix system of claim 1, wherein the broadcasters includes devices which are capable of transmitting and receiving packets.

13. The matrix system of claim 12, wherein the devices are selected from the group consisting of hub, switch hub, bridge and router.

14. The matrix system of claim 13, wherein the devices broadcast the keyboard, video, mouse data packets in an Ethernet standard.

15. The matrix system of claim 13, wherein the transmission distances between the console terminals and computers are extended by additionally added one or more hubs.

16. A matrix architecture for connecting a plurality of console terminals to a plurality of computers, wherein each of the console terminals has a keyboard, a mouse and a monitor, the matrix architecture comprising:

a plurality of first extenders, each coupled to one of the console terminals, transforming keyboard, mouse signals generated by the coupled console terminal into keyboard, mouse data packets and transforming received video data packets into video signals to be displayed on the monitor of the computed console terminal, wherein each of the keyboard, mouse data packets, has a source address associated with the coupled console terminal and a target address associated with one of the computers, and each of the video data packets has a source address associated with one of the computers and a target address associated with the coupled console terminal;

a plurality of second extenders each coupled to one of the computers, transforming video signals generated by the coupled computer into video data packets and transforming received keyboard, mouse data packets into the keyboard, mouse signals for the coupled computer, wherein each of the video data packets has a source address associated with the coupled computer and a target associated with one of the console terminals, and each of the keyboard, mouse data packets has a source address associated with one of the console terminals and a target address associated with one of the computers; and a plurality of broadcasters, broadcasting the keyboard, mouse data packets from any one of the first extenders to all of the second extenders, and broadcasting the video data packets from any one of the second extenders to all of the first extenders, regardless of the target addresses in the data packets.

17. The matrix architecture of claim 16, wherein the source address and the target address are IP addresses.

18. The matrix architecture of claim 16, wherein the source address and the target address are MAC addresses.

19. The matrix architecture of claim 16, wherein the first extender responds to the video data packets, each having the target address indicating the console terminal coupled with the first extender according to the standard of Ethernet.

20. The matrix architecture of claim 16, wherein a second extender of the plurality of second extenders responds to the keyboard, mouse data packets, each having the target address indicating the computer coupled with the second extender according to the standard of Ethernet.

21. The matrix architecture of claim 16, wherein the broadcasters are devices, which are capable of transmitting and receiving packets.

22. The matrix architecture of claim 21, wherein the devices are selected from the group consisting of hub, switch hub, bridge and router.

23. The matrix architecture of claim 22, wherein the devices broadcast the keyboard, video, mouse data packets in an Ethernet standard.

24. The matrix architecture of claim 22, wherein the transmission distances between the console terminals and computers are extended by additionally added one or more hubs.

25. A method for routing data between one of a plurality of console terminals to one of a plurality of computers in a matrix architecture, wherein each console terminal is connected to one of a plurality of first extenders and each computer is connected to one of a plurality of second extenders, the method comprising the steps of:

each first extender transforming keyboard, mouse signals generated by the connected console terminal into keyboard, mouse data packets, each keyboard, mouse data packet having a source address associated with the one of the console terminals and a target address associated with one of the computers;

a broadcaster structure broadcasting the keyboard, mouse data packets from any one of the first extenders to all of the second extenders regardless of the target addresses in the data packets;

each second extender examining the target address of the keyboard, mouse data packets and transforming the keyboard, mouse data packets received from the broadcaster structure into the keyboard, mouse signals to control the connected computer based on the target address of the data packets;

each second extender transforming video signals generated from the connected computer into video data packets, each video data packet having a source address associated with the connected computer and a target address associated with one of the console terminals;

the broadcaster structure broadcasting the video data packets from any one of the second extenders to all of the first extenders regardless of the target addresses in the data packets; and each first extender examining the target address of the keyboard, mouse data packets and transforming the video data packets received from the broadcaster structure into video signals to be displayed on a monitor of the connected console terminal.

26. The method of claim 25, wherein the steps of broadcasting are achieved by at least two broadcasters.

27. The method of the claim 25, wherein the steps of broadcasting are achieved by at least two devices, which are capable of transmitting and receiving packets.

28. The method of the claim 25, wherein the steps of broadcasting are achieved by at least two hubs.

29. The method of claim 25, wherein the first and the second extenders respond to the keyboard, video, mouse data packets according to the standard of Ethernet to select one of the console terminals in response to predetermined one of the computers.

30. The method of claim 25, further comprising a step of compressing the video data packets before the step of transforming the video signals into the video data packets by the second extenders.

31. The method of claim 25, further comprising a step of decompressing the video data packets before the step of transforming video data packets into video signals to be displayed on a monitor of the console terminals.

32. A matrix system for connecting a plurality of console terminals to a plurality of computers, comprising:

a plurality of first extenders each for coupling to a corresponding console terminal, each first extender transforming keyboard and mouse signals from the corresponding console terminal into the keyboard and mouse data packets, each keyboard and mouse data packet having a source address associated with the coupled console terminal and a target address associated with one of the computers;

a plurality of second extenders each for coupling to a corresponding computer, each second extender transforming video signals from the corresponding computer into video data packets, each video data packet having a source address associated with the coupled computer and a target address associated with one of the console terminals; and a broadcaster structure coupled to the plurality of first extenders and the plurality of second extenders, the broadcaster structure broadcasts the keyboard and mouse data packets from each first extender to all of the plurality of second extenders and broadcasts the video data packets from each second extender to all of the plurality of first extenders regardless of the target addresses in the data packets, wherein each second extender transforms a keyboard and mouse data packet received from the broadcaster structure into keyboard and mouse signals and transfers the keyboard and mouse signals to the corresponding computer only if the target address of the keyboard and mouse data packet is associated with the corresponding computer, and wherein each first extender transforms a video data packet received from the broadcaster structure into video signals and transfers the video signals to the corresponding console terminal only if the target address of the video data packet is associated with the corresponding console terminal.

33. The matrix system of claim 32, wherein the source addresses and target addresses are IP addresses or MAC addresses.

34. The matrix system of claim 32, wherein each first extender responds to the video data packets each having the target address indicating the console terminal coupled with the first extender according to the standard of Ethernet, and wherein each second extender responds to the keyboard, mouse data packets each having the target address indicating the computer coupled with the second extender according to the standard of Ethernet.

35. The matrix system of claim 32, wherein each of the first extenders comprises:

a first central processing unit (CPU), decompressing the video data packets, each having target address indicating the console terminals; and a digital-to-analog converter, transforming the video data packets into the video analog signals for the monitor of the console terminals; and wherein each of the second extenders comprises:

an analog-to-digital converter, transforming the video analog signals from the computer into the video data packets; and a second CPU, compressing the video data packets transformed from the video analog signals.

* * * * *